United States Patent [19]

Billigmeier et al.

[11] Patent Number: 4,639,483

[45] Date of Patent: Jan. 27, 1987

[54] SOAP-THICKENED REENTERABLE GELLED ENCAPSULANTS

[75] Inventors: James E. Billigmeier, St. Paul, Minn.; James D. Groves, Hudson, Wis.; Harwick A. Haugen, Roseville; Richard J. Pokorny, North St. Paul, both of Minn.

[73] Assignee: Minnesota Mining and Manufacturing Company, St. Paul, Minn.

[21] Appl. No.: 732,423

[22] Filed: May 9, 1985

[51] Int. Cl.[4] .......... C08K 5/09

[52] U.S. Cl. .......... 524/296; 523/173; 524/321; 524/322; 524/445; 524/474; 524/503; 524/505; 524/906; 525/939

[58] Field of Search .......... 523/173; 524/474, 322, 524/503, 505, 445, 906, 296, 321; 525/939

[56] References Cited

U.S. PATENT DOCUMENTS

| | | | |
|---|---|---|---|
| 3,412,027 | 11/1968 | Clark et al. | 252/40.7 |
| 3,717,600 | 2/1973 | Dalhuisen et al. | 260/23 H |
| 3,879,575 | 4/1975 | Dobbin et al. | 174/92 |
| 3,923,712 | 12/1975 | Vickery | 524/488 |
| 4,102,716 | 7/1978 | Groves et al. | 156/48 |
| 4,168,258 | 9/1979 | Braver et al. | 524/474 |
| 4,176,240 | 11/1979 | Sabia | 174/23 C |
| 4,190,570 | 2/1980 | Kaufman et al. | 523/173 |
| 4,222,915 | 9/1980 | Wolff et al. | 524/430 |
| 4,351,913 | 9/1982 | Patel | 523/173 |
| 4,361,507 | 11/1982 | Bourland | 523/173 |
| 4,361,508 | 11/1982 | Bourland | 523/173 |
| 4,395,349 | 7/1983 | Kinoshita | 525/343 |
| 4,426,230 | 1/1984 | Davis et al. | 523/173 |
| 4,431,776 | 2/1984 | Honsberg | 525/192 |
| 4,509,821 | 4/1985 | Stenger | 523/173 |

FOREIGN PATENT DOCUMENTS 2092176 1/1982 United Kingdom .

*Primary Examiner*—Herbert J. Lilling
*Attorney, Agent, or Firm*—Donald M. Sell; James A. Smith; Lorraine R. Sherman

[57] ABSTRACT

A gelled dielectric encapsulant material and process therefor for use in reenterable and nonreenterable communication cable splices as well as applications relating to encapsulation of electronic components comprises a plasticizer which does not stress crack polycarbonate, an aliphatic or aromatic carboxylic acid, and a basic oxide or hydroxide.

24 Claims, No Drawings

SOAP-THICKENED REENTERABLE GELLED ENCAPSULANTS

FIELD OF THE INVENTION

The present invention relates to a gelled dielectric encapsulant material for use in reenterable and nonreenterable communication cable splices as well as applications relating to encapsulation of electrical connections. In another aspect, a process for protecting communication cable and electronic components from moisture using the composition of the instant invention is disclosed.

BACKGROUND OF THE INVENTION

It is state of the art that distribution cable now being installed in domestic telephone systems is buried beneath the ground. Installation and maintenance of cable requires the cable to be spliced. Distribution cables may contain several hundred wire pairs. Each wire must be isolated and spliced to another wire. Since most of the cable is waterproofed to prevent corrosion that typically occurs when wires become water soaked, it has been widely adopted to fill splice closures with hydrophobic filling materials to prevent disruption or deterioration of service that can occur when cable becomes flooded with water.

Although the physical function of cable-filling material is straightforward, the choice of the material is not. Among the many considerations that are important for materials used in such applications are the hydrophobic nature of the material, stability on aging, low temperature properties, flow characteristics at elevated temperatures, processing characteristics, handling characteristics, dielectric properties, toxicity, and cost.

Compositions for use in electric cables which are essentially mixtures of elastomers, polymers and oils are disclosed in G.B. No. 2,092,176, and U.S. Pat. Nos. 4,102,716, 4,176,240 and 3,879,575.

U.S. Pat. No. 3,717,600 discloses MgO in combination with a rubber plasticizer and a surface active agent and/or metallic soap for use in chloroprene polymer compounding and processing.

U.S. Pat. No. 3,412,027 discloses a lubricating grease comprising an oil, a calcium soap or a calcium salt of a fatty acid, and an elastomer.

SUMMARY OF THE INVENTION

Briefly, the present invention provides an encapsulant composition comprising (a) a plasticizer which does not stress-crack polycarbonate and preferably is a naphthenic or paraffinic oil having an aromatic content of less than 15 weight percent, (b) an aliphatic or aromatic carboxylic acid, and (c) a basic oxide or hydroxide.

In one embodiment herein designated Encapsulant Composition A, the composition optionally further comprises a hydrophilic (water-attracting) substance and optionally an elastomer, the composition preferably being formulated as a one-part encapsulant. This is a reenterable encapsulant for communication splices in non-pressurized, grease-filled or non-greased filled communication cable. It will remain in a soft, reenterable state until water contacts it. Then, it reacts with the water to produce a hard encapsulant which will stop further penetration by water. The composition will only become hard where water has come in contact with it. Prior art encapsulants are either soft and allow water to pass through or hard and not reenterable.

In a second embodiment herein designated Encapsulant Composition B, which is a 2-part encapsulant composition in which the two parts react upon mixing, an elastomer is optionally present.

DETAILED DESCRIPTION

Two preferred embodiments, designated Encapsulant Compositions A and B, will be described. Encapsulant Composition A comprises:

(a) a plasticizer which can be a naphthalenic or paraffinic oil having an aromatic (single ring, fused ring, or polyaromatic hydrocarbon) content of less than 15 weight percent and a paraffinic (saturated or unsaturated straight-chain or cyclic hydrocarbon) content of 85 to 100 weight percent, the oil having a specific gravity in the range of 0.80 to 1.00, preferably 0.82 to 0.94, (b) an aliphatic or aromatic carboxylic acid having 18 to 1000 carbon atoms, preferably having 18 to 200 carbon atoms, (c) a basic oxide selected from CaO or ZnO, (d) optionally, an elastomer which is soluble in the composition, and (e) optionally, a hydrophilic additive.

This embodiment is based on the surprising feature that certain carboxylic acids may be combined with certain inorganic basic oxides (i.e., CaO and ZnO) in oils to form a paste in which no reaction between the acid and the base will take place and which is stable at ambient conditions. However, upon the addition of water the acid and base react to form a hard solid. The presence of water generates a "soap" in situ which surprisingly serves to thicken oils at moderate temperatures (e.g., 0° to 60° C.). This is a particularly desirable property in a reenterable encapsulant composition used with buried communication cable where the ingress of water can cause a reaction to take place in the composition which provides a solid protective material for the cable. It is further surprisingly that certain thermoplastic elastomers in "crumb" form can swell and dissolve in oil, without any mixing of the elastomer and the oil, and thicken the oil by forming a homogeneous gel even at ambient temperatures. Use of such an elastomer is particularly desirable in applications involving on-site repairs where the encapsulant composition is to be applied directly to the closure without prior mixing.

The plasticizer, carboxylic acid, and basic oxide form a composition having the consistency of grease. Upon the ingress of water, the composition sets up to the consistency of a hard rubber or plaster of paris. In this embodiment, only basic materials which do not react with acids in the absence of water are useful. Preferred bases are calcium oxide and zinc oxide.

Encapsulant Composition A comprises 35 to 90 parts, and preferably 45 to 65 parts, by weight of the total composition of a plasticizer which can be a naphthenic oil (oil that contains cycloparaffins) or paraffinic oil. Any plasticizer oil which does not stress crack polycarbonate can be used. The test used was as follows: A base of a telecommunications polycarbonate modular connector (4000D Supermini TM module, 3M) was bowed until there was a distance of 10 cm between the ends of the base. It was fixed in this position by attaching a copper wire to each end. The sample was then immersed in a plasticizer to be tested which had a depth of 2.5 cm. If the base did not snap after standing 24 hours, the plasticizer was acceptable for use. Representative plasticizers which can be used include: naphthenic oils (Tufflo TM 500—carbon type analysis %, $C_A$—12, $C_N$—41, $C_p$—47, specific gravity 0.916, Atlantic Richfield Company), paraffinic oils (Tufflo TM 30—carbon type analysis %, $C_A$—4, $C_N$—28, $C_p$13 68, Atlantic Richfield Company), Mineral oil (e.g., American White Oil #31 USP, specific gravity 60/60 0.828, Amoco Chemical Corporation), polybutene oligomer (Indopol TM H-25, Amoco Chemical Company), and naphthenic oil (Shellflex TM -371 Shell Oil Co.)

A variety of saturated, unsaturated, and aromatic acids, which can be mono-, di-, tri-, and tetra-carboxylic acids, are useful in the present invention. Representative examples of useful acids include stearic acid, isostearic acid, 12-hydroxy stearic acid, ricinoleic, linolenic acid, mixture of 10% stearic and 88% arachidic/behenic and 2% oleic acids (Hystrene TM 9022, Witco Chemical Corp.), trimer acid (Hystrene TM 5460, a mixture of 60% trimer and 40% dimer acids, Witco Chemical Corp.), dimer acid (Hystrene TM 3695 which contains 95% dimer acid, 4% trimer acid, and 1% $C_{18}$ acid monomer, Witco Chemical Corp.), phenyloctadecanoic acid, tall oil fatty acid [(e.g., fatty acid composition: linoleic non-conjugated 34%, linoleic conjugated 9%, oleic 44%, saturated 5%, other fatty acids 8%), Actinol TM FA1 Arizona Chemical Co.], polymeric diacids such as Hycar TM 2000X-162 CTB, Hycar TM 200X-265 CTB, Hycar TM 2000X-156 CTB, Hycar TM 1300X-15 CTBN, and Hycar TM 1300X-9 CTBNX (carboxyl-terminated butadiene, B. F. Goodrich Co.). Preferred acids are stearic, dimer, and Hycar 2000X-162 CTB. The amount of acid used is in the range of 9 to 20, preferably 12 to 15, parts by weight of the total composition. These acids are oil compatible and react with basic oxides in the presence of water to produce a stiff material.

The basic compounds (CaO, ZnO) are present in an amount in the range of 2 to 20, and preferably 4 to 7.5 parts by weight of the total composition. These basic oxides react with water to produce hydroxides which can then react with carboxylic acids.

Elastomers, as mentioned above, which dissolve in the composition and form a homogeneous gel without the necessity of any mixing can be included in the composition. Particularly useful are elastomers having solubility parameters of 7 to 9. Elastomers, depending on the other components, which can be useful are:

- styrene-ethylene-butylene-styrene block copolymer, 28/72 styrene/rubber ratio (Kraton TM G-1650, Shell Chemical Company),
- styrene-ethylene-butylene-styrene block copolymer, 33/67 styrene/rubber ratio (Kraton TM G-1651, Shell Chemical Company),
- styrene-ethylene-butylene-styrene block copolymer, 29/71 styrene/rubber ratio (Kraton TM G-1652, Shell Chemical Company),
- styrene-ethylene-butylene-styrene block copolymer, 14/86 styrene/rubber ratio (Kraton TM G-1657, Shell Chemical Company),
- styrene-ethylene-butylene-styrene block copolymer, 33/67 styrene/rubber ratio, 40% plasticizer oil content (Kraton TM G-4600, Shell Chemical Company),
- styrene-ethylene-butylene-styrene block copolymer, 33/67 styrene/rubber ratio, 47% plasticizer oil content (Kraton TM G-4609, Shell Chemical Company),
- styrene-butadiene-styrene block copolymer, 31/70 styrene/rubber ratio (Kraton TM D-1101, Shell Chemical Company),
- styrene-butadiene-styrene block copolymer, 28/72 styrene/rubber ratio (Kraton TM D-1102, Shell Chemical Company),
- styrene-isoprene-styrene block copolymer, 14/86 styrene/rubber ratio (Kraton TM D-1107, Shell chemical Company),
- ethylene-propylene terpolymer (Nordel TM 2744, DuPont Company),
- styrene-butadiene rubber—23% bound styrene (Ameripol TM 1006, BF Goodrich Company),
- styrene-butadiene rubber—43% bound styrene (Ameripol TM 1013, BF Goodrich Company),
- styrene-butadiene rubber—30% bound styrene (Ameripol TM 4503, BF Goodrich Company),
- ethylene-propylene copolymer (Polysar TM 306, Polysar Incorpoarated),
- ethylene-propylene copolymer (Polysar TM 807, Polysar Incorporated),
- ethylene-propylene terpolymer (Polysar TM 5465, Polysar Incorporated),
- styrene-butadiene block copolymer—43% bound styrene (Firestone TM S-840 AP, Firestone Synthetic Rubber and Latex Company),
- butyl rubber (Exxon TM Butyl 065, Exxon Chemical Company),
- polyisobutylene (Vistanex TM LMMS, Exxon Chemical Company),
- acrylonitrile-butadiene polymer (Hycar TM 1052, BF Goodrich Company),
- acrylonitrile-butadiene polymer (Hycar TM 1032x45, BF Goodrich Company),
- ethylene-propylene rubber (Vistalon TM 719, Exxon Chemical Company),
- ethylene-propylene rubber (Vistalon TM 1721, Exxon Chemical Company),
- butyl rubber (Enjay TM, Enjay Chemical Company), and
- styrene-butadiene block copolymer, 25/75 ratio (Solprene TM 1205, Phillips Chemical Company).

The preferred elastomers are Kratons G-1650, G-1652, G-1657, G-4600, and G-4609. The elastomers can be present in the encapsulant composition in the range of 0 to 10 parts by weight, preferably in the range of 1 to 5 parts by weight of the total composition.

The hydrophilic substance, which is optionally present, may be a hydrophilic clay such as Bentone TM SD-1 (Organoclays, NL Chemicals/NL Industries), or a hydrophilic polymer such as polyvinyl pyrrolidone or polyvinyl alcohol. A hydrophilic substance can be used in this embodiment because it speeds up the reaction that takes place upon the ingress of water which results in the formation of a hard rubber or plaster of paris-like material. When a hydrophilic substance is used, the composition may be in two parts. The water-attracting substance can be in one part and the other components in a second part. Use of such a two-part composition effectively controls the reaction rate. A hydrophilic substance can be present in an amount in the range of 0 to 40 weight percent of the total composition, preferably 10 to 20 weight percent.

Encapsulant Composition B comprises a two-part composition for the in situ generation of a soap when the two parts are mixed.

PART I is a composition comprising:

(a) a plasticizer which can be a naphthenic or paraffinic oil (as defined above for Encapsulant Composition A) having an aromatic content of less than 15 weight percent, and (b) an aliphatic or aromatic mono-, di-, tri-, or tetra-carboxylic acid having 2 to 1000 carbon atoms, preferably 5 to 200 carbon atoms, and most preferably 5 l to 21 carbon atoms;

PART II comprises:

(c) a basic oxide or hydroxide, and (d) optionally, an elastomer which is soluble in the composition of part I.

In Encapsulant Composition B, upon mixing of the two parts a soap is rapidly generated in situ which soap becomes suspended in the oil, thereby thickening the oil to form a grease. If an elastomer (which can be in crumb form) is present it slowly swells and dissolves in the composition to produce a firm rubbery gel.

It may be desirable to place the elastomer, which can be in crumb form, directly around the connection to be protected, then mixing the other components and pouring them onto the elastomer. The composition will set-up to give a homogeneous rubbery gel without the necessity for mixing.

By varying the components, compositions with gel times from less than 1 minute to more than 200 minutes, preferably 1 minute to 60 minutes, and flow points ranging from 49° C. (120° F.) to more than 100° C. (212° F.), and preferably above 100° C. can be provided. Because of the presence of the soap, the grease or gel has a higher flow point than the plasticizer or plasticizer plus elastomer alone. This is advantageous because it is necessary to meet industry specifications in certain applications.

Other additives can be present in any embodiment to provide elevation of the flow point or as thickening agents to either or both of the parts of the composition. Additives that may be present include Bentone SD-1 (Organoclays, NL Chemicals/NL Industries); Corn Cobs (derivatives of Corn Cobs, the Andersons'); powdered polyvinyl chloride (Geon TM, such as Geon 138 or 92, BF Goodrich Company); amorphous fumed silica (CAB-O-Sil TM (M-5), Cabot Corporation); Infusorial Earth—Diatomateous Earth (Fisher Scientific Company); Mica (Martin Marietta Magnesis Specialities); metal soaps such as calcium salt of lauric acid (calcium laurate, Pfaltz & Bauer, Inc.), Magnesium salt of stearic acid (magnesium stearate, Fisher Scientific Company), aluminum salt of stearic acid (aluminum stearate, Fisher Scientific Company), aluminum salt of octanoic acid (aluminum octoate, Witco Chemical Corporation), polymeric soaps (e.g., polyvinyl stearate ($—CH_2CH[O_2C(CH_2)_{16}CH_3]—)_n$, Aldrich Chemical Company, Inc.), anhydrides such as polyanhydride resin (PA-18, Gulf Oil Chemicals Company),glass walled hollow microspheres (C 15-250 Glass Bubbles, 3M Company), Smectite Clay (Ben-A-Gel TM EW, NL Chemicals/NL Industries); polyvinyl alcohol (Elvanol TM, E. I. dupont de Nemours & Company); polyvinylpyrrolidone (PVP D-90, GAF Corporation Chemical Products); high melting point resins, as shown in TABLES VIII and IX below, such as synthetic polyterpene tackifying resins (Neutac TM, Neville Chemical Company), petroleum hydrocarbon resin/alkylated (Neuchem TM, Neville Chemical Company), petroleum resins (LX TM series, Neville Chemical Company), coumarone-indene resin, softening point 155° C. (Cumar TM LX-509, Neville Chemical Company), hydrocarbon resin (Picco TM 5000, Hercules, Inc.), monomer hydrocarbon (Piccotex TM, Hercules, Inc.), and thermoplastic resin (Kristalex TM, Hercules, Inc.). These additions can range in amounts from 0 to 30 parts by weight, preferably 5 to 12 parts by weight of the total composition. Other additives that can be useful include antioxidants, fungicides, and flame-retardants.

The plasticizer which can be naphthenic or paraffinic oils useful in Encapsulant Composition B are any plasticizers described for Composition A. The plasticizer may be oils such as mineral oil, Shellflex 371, Tufflo 30, Tufflo 500 and polybutene (see Tables V and VI). The preferred plasticizers are Tufflo 30, Tufflo 500 and Shellflex 371. The plasticizers may range from 40 to 90 parts with the preferred range being 45 to 85 parts by weight of the total composition.

The carboxylic acids useful in Encapsulant Composition B are all of the acids described for encapsulant composition A plus the lower molecular weight aliphatic and aromatic, polymeric, halo, aralkyl, or sulfonic carboxylic acids, which can be mono-, di-, tri-, or tetra-carboxylic acids, having 2 to 17 carbon atoms including acetic, propionic, butyric, 4-chlorobutyric, valeric, hexanoic, octanoic, 2-ethylhexanoic, nonanoic, 10-undecenoic, lauric, myristic, oleic, adipic, benzoic, 2,4-hexadienoic, hexahydro-4-methylphthalic, cis-tetrahydrophthalic, benzoic, 3,5-dinitrobenzoic, 4-chlorobenzoic, phenylacetice, 3-benzoylacrylic, and organic sulfonic acids. The preferred acids are valeric acid, octanoic acid, 2-ethylhexanoic acid, lauric acid, oleic acid, and isostearic acid. The parts of acid may be varied from 3 to 40 parts with the preferred in the range of 5 to 15 parts by weight of the total composition.

Any base or hydroxide is useful in the Encapsulant Composition B so long as it reacts with the acid of the composition. Representative bases include oxides or hydroxides of lithium, sodium, potassium, barium, strontium, calcium, magnesium and zinc and the hydroxides of copper, nickel, bismuth and aluminum. The preferred bases are the oxides of calcium and zinc and the hydroxides of sodium, lithium, calcium and barium. The range in parts of base may be from 0.5 to 20 parts with the preferred range being 1 to 4 parts by weight of the total composition.

Elastomers which can be used in Encapsulant Composition B in an amount in the range of 0 to 20 parts, preferably 5 to 10 parts by weight of the total composition and can be any of the elastomers mentioned for composition A. The presence of an elastomer causes the gellation of the composition to a hard rubbery consistency. Elastomers such as Kratons G-1650, G-1652, G-1657, G-4600, G-4609, D1101, D1107, Ameripols 1006, 1013, 4503 and Exxon 065 may be added as gel-forming agents in amounts ranging from 0–20 parts. Preferred elastomers are Kratons G-1650, G-1652, G-1657, G-4600, and G-4609.

The compositions of the present invention find utility in all application where it is desired to encapsulate communication cable and electronic components. They are particularly useful as reenterable encapsulants for the protection of telephone cable splices from the ingress of water.

In the examples below, the time to thicken was determined by a Sunshine TM Gel Meter or by inserting a stick into the mass and observing if the material flowed together when the stick was removed. Other observations such as no reaction, precipitation, etc., are reported. The test to determine the flow point was devised to determine the slump characteristics of the oil-extended, soap-thickened thermoplastic rubber. To determine the flow point a 0.5 to 1.0 g sample was placed on an elevated polypropylene screen (twelve 2.5 mm×2.5 mm squares per $cm^2$) in an air circulating oven at 38° C. Each sample remained at each specific temperature for a minimum of 2 hours. If the sample flowed through the mesh the test was stopped and the flow point was recorded at that temperature. If the sample did not flow through the mesh after a 2 hour minimum, the temperature was increased by 9.5° C. (20° F.). This sequence was repeated until the sample flowed through the mesh, and the flow point was recorded.

Objects and advantages of this invention are further illustrated by the following examples, but the particular materials and amounts thereof recited in these examples, as well as other conditions and details, should not be construed to unduly limit this invention. All weights are in grams unless otherwise stated.

EXAMPLE 1 (ENCAPSULANT COMPOSITION A)

The samples in TABLE I show formulations of typical systems in which the components (in grams) were mixed together under ambient conditions.

In these samples the "soap" reaction was facilitated by the addition of water as shown in reactions (1) and (2) below:

(1) No $H_2O$: $CaO + RCO_2H \xrightarrow{\text{PVA, OIL}}$ Very slow reaction
"phase-separated"

(2) $H_2O$ Added: $CaO + H_2O \xrightarrow{\text{PVA, OIL}} Ca(OH)_2$
$Ca(OH)_2 + 2RCO_2H \longrightarrow Ca(OCOR)_2 + H_2O$
"phase-contiguous"

wherein R is the organic group of any of the above-mentioned acids.

TABLE I

Water Reactive Grease Formulations

| Sample | 15% Stearic acid in mineral oil | 20% Stearic acid in mineral oil | 25% Stearic acid in Tufflo-500 | Hycar 2000X-162 CTB | Hystrene 3695 | Calcium oxide | polyvinyl alcohol | Time to thicken when water is added |
|---|---|---|---|---|---|---|---|---|
| 1 | | 30 | | 2 | | 2 | | 50 min |
| 2 | 30 | | | 2 | | 2 | | >2 hrs |
| 3 | 30* | | | 2 | | 2 | | 50 min |
| 4 | | 30 | | 1 | | 3 | | 2 hrs |
| 5 | | 30 | | 3 | | 3 | | 1 hr |
| 6 | | 30 | | 1 | | 3 | | 2 hrs |
| 7 | | 30* | | 3 | | 3 | | 1½ hrs |
| 8 | | 30* | | 45 | | 3 | | 1½ hrs |
| 9 | | 30* | | | 4.5 | 3 | | >2 hrs |
| 10 | | 30 | | | 4.5 | 3 | | >2 hrs |
| 11 | | 30* | | 5 | | 3 | | 77 hrs |
| 12 | | 30* | | 5 | | 3 | 5 | 40 min |
| 13 | | | 30 | 5 | | 3 | | 75 min |
| 14 | | | 30 | 5 | | 6 | | 70 min |
| 15 | 30* | | | 2 | | 2 | 5 | 25 min |
| 16 | 30* | | | 2 | | 2 | 10 | 10 min |
| 17 | 30* | | | 5 | | 2 | 5 | 20 min |
| 18 | 30* | | | 5 | | 2 | 10 | 10 min |
| 19** | | | | | | 10 | 15 | slow |
| 20** | | | | 5 | | 10 | 15 | 10 min |
| 21 | 30* | | | | | 5 | 10 | 15 min |

*in Tufflo-500 oil
**30 g Tufflo-500 oil added

TABLE II

Water Reactive Grease Formulations

| Sample | Calcium Oxide | polyvinyl[a] alcohol | Tufflo-500 oil | Other base | Octanoic[d] acid | Hycar 2000X 162 CTB | Hystrene 3695 | Time to thicken when water is added |
|---|---|---|---|---|---|---|---|---|
| 22 | 5 | 10 | 30 | | | | 10 | <5 min |
| 23 | 5 | 20 | 30 | | | 5 | | 7.5 min |
| 24 | | 20 | 30 | 5 MgO | | | 10 | 20 min |
| 25 | | 20 | 30 | 5 MgO | | | 10 | b |
| 26 | | 20 | 30 | 5 BaO | | | 10 | 61 min |
| 27 | | 20 | 30 | 5 BaO | | | 10 | b |
| 28 | | 20 | 30 | 5 ZnO | | | 10 | 2 hrs |
| 29 | 5 | 20 PVP | 30 | | | | 10 | 10.5 min |
| 30 | 5 | 20 B | 30 | | | | 10 | >3 hrs |
| 31 | 5 | 20 | 28.2[c] | | | | 10 | 10.7 min |
| 32 | 5 | 5 BSD | 30 | | | | 10 | 15.7 min |
| 33 | 5 | | 30 | | 10 | | | 2.1 min |
| 34 | 5 | | 30 | 5 MgO | 10 | | | 2.2 min |
| 35 | | | 30 | 5 BaO | 10 | | | 0.8 min |

TABLE II-continued

Water Reactive Grease Formulations

| Sample | Calcium Oxide | polyvinyl[a] alcohol | Tufflo-500 oil | Other base | Octanoic[d] acid | Hycar 2000X 162 CTB | Hystrene 3695 | Time to thicken when water is added |
|---|---|---|---|---|---|---|---|---|
| 36 | | | 30 | 5 ZnO | 10 | | | 1.9 min |

[a]PVP — Polyvinyl Pyrrolidone; B — Ben-A-Gel EW; BSD — Bentone SD-1
[b]slow reaction without water
[c]1.8 gm. Kraton G-1657 added
[d]all reacted without water to gel oil The data show that:

1. a variety of water-attracting substances may be used (samples 29, 30, 32).
2. The only basic oxides which require the presence of water to react, and are therefore useful in this embodiment, are ZnO and CaO (samples 25, 27 show reactivity of MgO and BaO).
3. Octanoic acid (and other acids having fewer than 18 carbon atoms) reacts with basic oxides in the absence of water to gel the plasticizer.
4. Extenders such as Kraton G-1657 may be used (sample 31).
5. The plasticizer used for a water reactive encapsulant may be a mineral oil or naphthenic oil with the napthenic oil being preferred. The parts of plasticizer can range from 35–90 with the preferred range being 45–65.
6. The base for a water-reactive encapsulant may be ZnO or CaO with the preferred base being CaO. The parts of base may range from 2–20 with the preferred being from 4–7.5.
7. The acids for a water reactive encapsulant may range from $C_{18}$ to $C_{1000}$, preferably $C_{18}$ to $C_{200}$, and include dicarboxylic acids such as dimer acid, unsaturated acids, and polymeric carboxylic acids such as Hycar 2000X 162 CTB. The preferred acid is dimer acid. The parts of the acid may range from 9 to 20 with the preferred being 12 to 15 parts.
8. The water-attracting substance for a water-reactive encapsulant may be a hydrophilic clay such as Bentone SD-1 or a hydrophilic polymer such as polyvinyl pyrrolidone or polyvinyl alcohol.

Preferred formulations are those of samples 12, 15 to 18, 20 to 23, 29, 31 and 32. The formulations of samples 1 to 11, 13, 14 and 30 are also within the scope of the invention.

EXAMPLE 2 (ENCAPSULANT COMPOSITION B)

In samples 37 to 137 (see TABLE III, below) Part I (oil and acid mixture) was added to Part II (elastomer plus base), mixed for 30 seconds and the gel time (time when composition has attained a viscosity of 100 Pa seconds (100,000 cps)) was recorded using a Sunshine™ gel meter (Sunshine Scientific Instruments). All weights were in grams. The acids and bases reacted in a 1:1 equivalent ratio. The reactions below illustrate the overall concept:

(1) $RCO_2H + MOH \xrightarrow{\text{plasticizer}} MOCOR + H_2O$ thickening reaction
"soap"

(2) $MOCOR + \text{Block Polymer} \xrightarrow{\text{plasticizer}} \text{Gel Encapsulant}$ M = Cation
R = the organic group of any of the above-mentioned acids.

TABLE III

| Sample | Acid name | Acid | LiOH | NaOH | KOH | Mg (OH)2 | Ca(OH)2 | Ba(OH)2 | Kraton G-1650 | Tufflo-500 | Gel time min. | Flow Point (°F.) | Flow Point (°C.) |
|---|---|---|---|---|---|---|---|---|---|---|---|---|---|
| 37 | valeric acid | 7 | 2.88 | | | | | | 10 | 83 | 6.9 | 120 | 49 |
| 38 | valeric acid | 7 | | 2.74 | | | | | 10 | 83 | 6.4 | 320+ | 160+ |
| 39 | valeric acid | 7 | | | 3.85 | | | | 10 | 83 | 6.3 | 120 | 49 |
| 40 | valeric acid | 7 | | | | 4.00 | | | 10 | 83 | 13.0 | 120 | 49 |
| 41 | valeric acid | 7 | | | | | 5.08 | | 10 | 83 | 1.5 | 140 | 60 |
| 42 | valeric acid | 7 | | | | | | 11.76 | 10 | 83 | 7.5 | 120 | 49 |
| 43 | valeric acid | 14 | 5.76 | | | | | | 10 | 76 | 3.5 | 140 | 60 |
| 44 | valeric acid | 14 | | 5.49 | | | | | 10 | 76 | 4.2 | 320+ | 160+ |
| 45 | valeric acid | 14 | | | 7.70 | | | | 10 | 76 | 2.9 | 120 | 49 |
| 46 | valeric acid | 14 | | | | 8.01 | | | 10 | 76 | 5.3 | 140 | 60 |
| 47 | valeric acid | 14 | | | | | 10.17 | | 10 | 76 | 1.0 | 320+ | 160+ |
| 48 | valeric acid | 14 | | | | | | 23.52 | 10 | 76 | 1.3 | 320+ | 160+ |
| 49 | octanoic acid | 7 | 2.04 | | | | | | 10 | 83 | 19.9 | 120 | 49 |
| 50 | octanoic acid | 7 | | 1.94 | | | | | 10 | 83 | 17.0 | 120 | 49 |
| 51 | octanoic acid | 7 | | | 2.72 | | | | 10 | 83 | 14.1 | 120 | 49 |
| 52 | octanoic acid | 7 | | | | 2.83 | | | 10 | 83 | 44.6 | 120 | 49 |
| 53 | octanoic acid | 7 | | | | | 3.60 | | 10 | 83 | 2.1 | 180 | 82 |
| 54 | octanoic acid | 7 | | | | | | 8.32 | 10 | 83 | 11.7 | 140 | 60 |
| 55 | octanoic acid | 14 | 4.08 | | | | | | 10 | 76 | 7.0 | 120 | 49 |
| 56 | octanoic acid | 14 | | 3.88 | | | | | 10 | 76 | 13.1 | 320+ | 160+ |
| 57 | octanoic acid | 14 | | | 5.45 | | | | 10 | 76 | 6.2 | 140 | 60 |
| 58 | octanoic acid | 14 | | | | 5.66 | | | 10 | 76 | 15.7 | 140 | 60 |
| 59 | octanoic acid | 14 | | | | | 7.19 | | 10 | 76 | 1.1 | 280 | 138 |
| 60 | octanoic acid | 14 | | | | | | 16.64 | 10 | 76 | 2.9 | 160 | 71 |
| 61 | octanoic acid | 10 | | | | | 6.00** | | 10 | 80 | 3 | 200 | 93 |
| 62 | 2-ethylhexanoic acid | 14 | 4.08 | | | | | | 10 | 76 | 20.1 | 320+ | 160+ |
| 63 | 2-ethylhexanoic acid | 14 | | 3.88 | | | | | 10 | 76 | 8.7 | 120 | 49 |

TABLE III-continued

| Sample | Acid name | Acid | LiOH | NaOH | KOH | Mg (OH)2 | Ca(OH)2 | Ba(OH)2 | Kraton G-1650 | Tufflo-500 | Gel time min. | Flow Point (°F.) | Flow Point (°C.) |
|---|---|---|---|---|---|---|---|---|---|---|---|---|---|
| 64 | 2-ethylhexanoic acid | 14 | | | 5.45 | | | | 10 | 76 | 12.1 | 120 | 49 |
| 65 | 2-ethylhexanoic acid | 14 | | | | 5.66 | | | 10 | 76 | 29.6 | 140 | 60 |
| 66 | 2-ethylhexanoic acid | 14 | | | | | 7.19 | | 10 | 76 | 6.1 | 140 | 60 |
| 67 | 2-ethylhexanoic acid | 14 | | | | | | 16.64 | 10 | 76 | 7.2 | 140 | 60 |
| 68 | lauric acid | 7 | 1.47 | | | | | | 10 | 83 | 34.3 | 140 | 60 |
| 69 | lauric acid | 7 | | 1.40 | | | | | 10 | 83 | 27.6 | 280 | 138 |
| 70 | lauric acid | 7 | | | 1.96 | | | | 10 | 83 | 19.9 | 120 | 49 |
| 71 | lauric acid | 7 | | | | 2.04 | | | 10 | 83 | 83.7 | 120 | 49 |
| 72 | lauric acid | 7 | | | | | 2.59 | | 10 | 83 | 42.4 | 160 | 71 |
| 73 | lauric acid | 7 | | | | | | 5.99 | 10 | 83 | 10.9 | 140 | 60 |
| 74 | lauric acid | 14 | 2.94 | | | | | | 10 | 76 | 10.2 | 320+ | 160+ |
| 75 | lauric acid | 14 | | 2.80 | | | | | 10 | 76 | 5.2 | 320+ | 160+ |
| 76 | lauric acid | 14 | | | 3.92 | | | | 10 | 76 | 6.7 | 140 | 60 |
| 77 | lauric acid | 14 | | | | 4.08 | | | 10 | 76 | 48.5 | 140 | 60 |
| 78 | lauric acid | 14 | | | | | 5.18 | | 10 | 76 | 4.0 | 240 | 115 |
| 79 | lauric acid | 14 | | | | | | 11.98 | 10 | 76 | 1.7 | 320+ | 160+ |
| 80 | dimer acid | 7 | 0.98 | | | | | | 10 | 83 | 94.2 | 120 | 49 |
| 81 | dimer acid | 7 | | 0.93 | | | | | 10 | 83 | 27.4 | 120 | 49 |
| 82 | dimer acid | 7 | | | 1.31 | | | | 10 | 83 | 107.9 | 120 | 49 |
| 83 | dimer acid | 7 | | | | 1.36 | | | 10 | 83 | 203.1 | 120 | 49 |
| 84 | dimer acid | 7 | | | | | 1.73 | | 10 | 83 | 100.3 | 140 | 60 |
| 85 | dimer acid | 7 | | | | | | 4.00 | 10 | 83 | 127.6 | 120 | 49 |
| 86 | dimer acid | 14 | 1.96 | | | | | | 10 | 76 | 79.1 | 120 | 49 |
| 87 | dimer acid | 14 | | 1.87 | | | | | 10 | 76 | 64.1 | 120 | 49 |
| 88 | dimer acid | 14 | | | 2.62 | | | | 10 | 76 | 106.0 | 120 | 49 |
| 89 | dimer acid | 14 | | | | 2.72 | | | 10 | 76 | 180.1 | 120 | 49 |
| 90 | dimer acid | 14 | | | | | 3.46 | | 10 | 76 | 138.6 | 120 | 49 |
| 91 | dimer acid | 14 | | | | | | 8.00 | 10 | 76 | 44.8 | 140 | 49 |
| 92 | Hycar 2000X 162 | 7 | 0.29 | | | | | | 10 | 83 | 72.9 | 120 | 49 |
| 93 | Hycar 2000X 162 | 7 | | 0.28 | | | | | 10 | 83 | 45.7 | 120 | 49 |
| 94 | Hycar 2000X 162 | 7 | | | 0.39 | | | | 10 | 83 | 105.0 | 120 | 40 |
| 95 | Hycar 2000X 162 | 7 | | | | 0.41 | | | 10 | 83 | 199.2 | 140 | 60 |
| 96 | Hycar 2000X 162 | 7 | | | | | 0.52 | | 10 | 83 | 96.5 | 140 | 60 |
| 97 | Hycar 2000X 162 | 7 | | | | | | 1.20 | 10 | 83 | 98.3 | 140 | 60 |
| 98 | Hycar 2000X 162 | 14 | 0.59 | | | | | | 10 | 76 | 46.7 | 140 | 60 |
| 99 | Hycar 2000X 162 | 14 | | 0.56 | | | | | 10 | 76 | 24.3 | 180 | 82 |
| 100 | Hycar 2000X 162 | 14 | | | 0.79 | | | | 10 | 76 | 101.4 | 140 | 60 |
| 101 | Hycar 2000X 162 | 14 | | | | 0.82 | | | 10 | 76 | 198.2 | 180 | 82 |
| 102 | Hycar 2000X 162 | 14 | | | | | 1.04 | | 10 | 76 | 80.1 | 140 | 60 |
| 103 | Hycar 2000X 162 | 14 | | | | | | 2.04 | 10 | 76 | 70.3 | 180 | 82 |
| 104 | benzoic acid* | 4.5 | 1.55 | | | | | | 5.0 | 40.5 | 0.7 | 120 | 49 |
| 105 | benzoic acid* | 4.5 | | 1.48 | | | | | 5.0 | 40.5 | 0.9 | 140 | 60 |
| 106 | benzoic acid* | 4.5 | | | 2.07 | | | | 5.0 | 40.5 | 1.4 | 120 | 49 |
| 107 | benzoic acid* | 4.5 | | | | 2.14 | | | 5.0 | 40.5 | 4.4 | 120 | 49 |
| 108 | benzoic acid* | 4.5 | | | | | 2.73 | | 5.0 | 40.5 | 6.1 | 140 | 60 |
| 109 | benzoic acid* | 4.5 | | | | | | 6.31 | 5.0 | 40.5 | 1.2 | 140 | 60 |
| 110 | 12-hydroxy stearic acid* | 4.5 | 0.63 | | | | | | 5.0 | 40.5 | Immed | 180 | 82 |
| 111 | 12-hydroxy stearic acid* | 4.5 | | 0.60 | | | | | 5.0 | 40.5 | Immed | 180 | 82 |
| 112 | 12-hydroxy stearic acid* | 4.5 | | | 0.84 | | | | 5.0 | 40.5 | Immed | 180 | 82 |
| 113 | 12-hydroxy stearic acid* | 4.5 | | | | 0.87 | | | 5.0 | 40.5 | Immed | 180 | 82 |
| 114 | 12-hydroxy stearic acid* | 4.5 | | | | | 1.11 | | 5.0 | 40.5 | Immed | 300 | 149 |
| 115 | 12-hydroxy stearic acid* | 4.5 | | | | | | 2.56 | 5.0 | 40.5 | Immed | 260 | 127 |
| 116 | linolenic acid | 4.5 | 0.68 | | | | | | 5.0 | 40.5 | 29.6 | 120 | 49 |
| 117 | linolenic acid | 4.5 | | 0.65 | | | | | 5.0 | 40.5 | 37.5 | 120 | 49 |
| 118 | linolenic acid | 4.5 | | | 0.91 | | | | 5.0 | 40.5 | 49.2 | 120 | 49 |
| 119 | linolenic acid | 4.5 | | | | 0.94 | | | 5.0 | 40.5 | 40.2 | 140 | 60 |
| 120 | linolenic acid | 4.5 | | | | | 1.20 | | 5.0 | 40.5 | 3.3 | 160 | 71 |
| 121 | linolenic acid | 4.5 | | | | | | 2.77 | 5.0 | 40.5 | 34.5 | 140 | 60 |
| 122 | ricinoleic acid | 4.5 | 0.63 | | | | | | 5.0 | 40.5 | 41.5 | 120 | 49 |
| 123 | ricinoleic acid | 4.5 | | 0.60 | | | | | 5.0 | 40.5 | 42.1 | 120 | 49 |
| 124 | ricinoleic acid | 4.5 | | | 0.83 | | | | 5.0 | 40.5 | 46.1 | 120 | 49 |
| 125 | ricinoleic acid | 4.5 | | | | 0.86 | | | 5.0 | 40.5 | 36.6 | 120 | 49 |
| 126 | ricinoleic acid | 4.5 | | | | | 1.10 | | 5.0 | 40.5 | 13.4 | 140 | 60 |
| 127 | ricinoleic acid | 4.5 | | | | | | 2.55.0 | 5.0 | 40.5 | 55.6 | 140 | 60 |
| 128 | 2,4-hexadienoic acid | 4.5 | 1.69 | | | | | | 5.0 | 40.5 | 0.8 | 140 | 60 |
| 129 | 2,4-hexadienoic acid | 4.5 | | 1.61 | | | | | 5.0 | 40.5 | 4.1 | 120 | 49 |
| 130 | 2,4-hexadienoic acid | 4.5 | | | 2.25 | | | | 5.0 | 40.5 | 4.0 | 140 | 60 |
| 131 | 2,4-hexadienoic acid | 4.5 | | | | 2.33 | | | 5.0 | 40.5 | 0.8 | 120 | 49 |
| 132 | 2,4-hexadienoic acid | 4.5 | | | | | 2.97 | | 5.0 | 40.5 | 1.3 | 300 | 149 |
| 133 | 2,4-hexadienoic acid | 4.5 | | | | | | 6.87 | 5.0 | 40.5 | 0.7 | 160 | 71 |
| 134 | oleic[1] acid | 10 | | | | | 2.83 | | 10 | 68 | 12 | >200 | >93 |
| 135 | oleic[2] acid | 10 | | | | | 2.10 | | 10 | 70 | 14 | 180 | 82 |
| 136 | oleic[3] acid | 10 | | | | | 2.10 | | 10 | 70 | 23 | 180 | 82 |

TABLE III-continued

| Sample | Acid name | Acid | LiOH | NaOH | KOH | Mg $(OH)_2$ | $Ca(OH)_2$ | $Ba(OH)_2$ | Kraton G-1650 | Tufflo-500 | Gel time min. | Flow Point (°F.) | Flow Point (°C.) |
|---|---|---|---|---|---|---|---|---|---|---|---|---|---|
| 137 | oleic[4] acid | 10 | | | | | 2.10 | | 10 | 70 | 18 | 180 | 82 |

**$Sr(OH)_2$
*45 g of 10% solution
[1]Other additive Bentone SD-1, 12 g
[2]Other additive magnesium stearate, 10 g
[3]Other additive aluminum stearate, 10 g
[4]Other additive polyvinyl stearate, 10 g The data of TABLE III show that a variety of acid and bases, plasticizers, elastomers, and additives that can be used in the practice of this invention.

EXAMPLE 3

Formulations for encapsulant compositions B shown in TABLE IV below were prepared using the procedure of Example 2.

TABLE IV

| Sample | Tufflo 500 Oil (g) | Tufflo 30 Oil (g) | DTDP* (g) | Mineral oil (g) | Indopol H-25 | Octanoic acid (g) | $Ca(OH)_2$ | Gel time (min) |
|---|---|---|---|---|---|---|---|---|
| 138 | 27 | | | | | 3 | 1.54 | 3.2 |
| 139 | 21 | | | | | 9 | 4.62 | 0.1 |
| 140 | | 27 | | | | 3 | 1.54 | 3.3 |
| 141 | | 21 | | | | 9 | 4.62 | 0.2 |
| 142 | | | 27 | | | 3 | 1.54 | 4.0 |
| 143 | | | 21 | | | 9 | 4.62 | 0.1 |
| 144 | | | | 27 | | 3 | 1.54 | 4.6 |
| 145 | | | | 21 | | 9 | 4.62 | 0.2 |
| 146 | | | | | 27 | 3 | 1.54 | 1.8 |
| 147 | | | | | 21 | 9 | 4.62 | 0.3 |

*DTDP — ditridecyl phthalate

The data of TABLE IV show that useful compositions can be prepared using a variety of plasticizers (oils), but without an elastomer being included.

EXAMPLE 4

The following compositions B were prepared as shown in TABLE V below.

TABLE V

Flow point versus Kraton G-1650 concentration in Tufflo 500 oil

| | Sample | Flow point (°F.) | Flow point (°C.) |
|---|---|---|---|
| 148 | 6% Kraton G-1650 in Tufflo 500 Oil | 70 | 21 |
| 149 | 8% Kraton G-1650 in Tufflo 500 Oil | 80 | 27 |
| 150 | 10% Kraton G-1650 in Tufflo 500 Oil | 95 | 35 |

TABLE V-continued

Flow point versus Kraton G-1650 concentration in Tufflo 500 oil

| | Sample | Flow point (°F.) | Flow point (°C.) |
|---|---|---|---|
| 151 | 12% Kraton G-1650 in Tufflo 500 Oil | 105 | 41 |

The data of TABLE V show that a mixture of elastomer and oil have a lower flow point than would be useful as an encapsulant composition. This data show the necessity of having a soap included in the composition.

EXAMPLE 5

Using the procedure of EXAMPLE 2, encapsulant compositions B were prepared having the formulations as shown in TABLE VI below:

TABLE VI

| Sample | Formulation Part A | Formulation Part B | Response Gel time (min) | Response Flow point °F. | Response Flow point °C. |
|---|---|---|---|---|---|
| 152 | 20 g oleic acid<br>180 g Tufflo 500 oil | 20 g Kraton G-1650<br>5.25 g $Ca(OH)_2$ | 5.8 | 160 | 71 |
| 153 | 20 g oleic Acid<br>175 g Tufflo 500 oil | 20 g Kraton G-1650<br>5 g C 15-250 glass bubbles<br>5.25 g $Ca(OH)_2$ | 3.4 | 180 | 82 |
| 154 | 20 g oleic acid<br>170 g Tufflo 500 oil | 20 g Kraton G-1650<br>10 g C 15-250 glass bubbles<br>5.25 g $Ca(OH)_2$ | 2.3 | 180 | 82 |

The data of TABLE VI show that glass microbubbles elevate the flow points of encapsulant compositions of the present invention.

EXAMPLE 6

Using the procedure of EXAMPLE 2, encapsulant compositions B were prepared having the formulations as shown in TABLE VII below.

TABLE VII

| | Formulation | | Response | | |
|---|---|---|---|---|---|
| | | | Gel time | Flow point | |
| Sample | Part A | Part B | (min) | °F. | °C. |
| 155 | 5 g oleic acid | 5 g Kraton G-1650 | 3.8 | 180 | 82 |
| | 37.5 g Tufflo 500 oil | 2.5 g Cumar LX-509 | | | |
| | | 1.31 g $Ca(OH)_2$ | | | |
| 156 | 5 g oleic acid | 5 g Kraton G-1650 | 3.9 | 180 | 82 |
| | 35 g Tufflo 500 oil | 5 g Cumar LX-509 | | | |
| | | 1.31 g $Ca(OH)_2$ | | | |
| 157 | 5 g oleic acid | 5 g Kraton G-1650 | 2.3 | 240 | 115 |
| | 25 g Tufflo 500 oil | 15 g Cumar LX-509 | | | |
| | | 1.31 g $Ca(OH)_2$ | | | |
| 158 | (Comparative) | | | | |
| | 5 g oleic acid | 5 g Kraton G-1650 | 5.8 | 160 | 71 |
| | 40 g Tufflo 500 oil | 1.31 g $Ca(OH)_2$ | | | |

The data of TABLE VII show that the use of a high temperature reinforcing resin (Cumar™ LX-509) raises the flow point of a gel within the present invention.

EXAMPLE 7

An evaluation of Encapsulant composition A was conducted to determine the effect of aging on a mixture of acid and basic oxide. Two, of each sample, were mixed in 50 ml beakers using a tongue depressor and aged at 21° C. (70° F.) and 60° C. (140° F.). The amount of time required before the tongue depressor could not be pulled out of the beaker was noted. The data is shown in TABLE VIII below.

TABLE VIII

| | Components | | Results of aging | |
|---|---|---|---|---|
| Sample | Dimer acid | Basic oxide | 21° C. | 60° C. |
| 159 | 10 g | magnesium oxide (5 g) | >1 month | 2 hours |
| 160 | 10 g | calcium oxide (5 g) | >1 month | slow reaction began after 5 days |
| 161 | 10 g | barium oxide (15 g) | <1 month | 3 days |
| 162 | 10 g | zinc oxide (5 g) | >1 month | slow reaction began after 7 days |

The data of TABLE VIII show that the two basic oxides, CaO and ZnO, provided compositions with useful shelf lives.

EXAMPLE 8

These trials evaluate the homogeneity of compositions to which elastomers are added.

Sample No. 1: Six g of Kraton G-1650 (crumb form) was placed in a 200 ml beaker to which 94 g of Tufflo-500 oil was added without mixing and left undisturbed for 30 days at 23° C.

Sample No. 2: Ninety-four g of Tufflo-500 oil was placed in a 200 ml beaker to which 6 g of Kraton G-1650 (crumb form) was added without mixing and left undisturbed for 30 days at 23° C.

After 30 days one-quarter cone penetration test ASTM 1403-69 (reapproved 1980) was run twice on the top and twice on the bottom of each sample to determine consistency.

TABLE IX

| | One-quarter cone penetration (1/10 mm) | |
|---|---|---|
| Sample No. | Top of the sample | Bottom of the sample |
| 1 | 99 | 102 |

TABLE IX-continued

| | One-quarter cone penetration (1/10 mm) | |
|---|---|---|
| Sample No. | Top of the sample | Bottom of the sample |
| | 99 | 102 |
| 2 | 102 | 100 |
| | 101 | 102 |

The data of TABLE IX show that, without mixing, the composition to which elastomer crumb was added or which was poured onto elastomer crumb resulted in the formation of a homogeneous gel.

Various modifications and alterations of this invention will become apparent to those skilled in the art without departing from the scope and spirit of this invention, and it should be understood that this invention is not to be unduly limited to the illustrative embodiments set forth herein.

We claim:

1. A composition of matter consisting essentially of a mixture of:
(a) 35 to 90 parts by weight of a plasticizer that does not stress-crack polycarbonate, said plasticizer being a naphthenic or paraffinic oil having an aromatic content of less than 15 weight percent, a paraffinic content of 85 to 100 percent, and a specific gravity in the range of 0.80 to 1.00,
(b) 9 to 20 parts by weight of an aliphatic or aromatic carboxylic acid having 18 to 100 carbon atoms,
(c) 2 to 20 parts by weight of a basic oxide or hydroxide, and
(d) an effective amount up to 10 parts by weight of an elastomer which is soluble in said composition and having a solubility parameter of 7 to 9, and
(e) optionally, an effective amount up to 30 parts by weight of at least one of thickening agents, flow point elevators, antioxidants, fungicides, and flame retardants.

2. The composition according to claim 1 wherein said elastomer is added in crumb form.

3. The composition according to claim 1 further comprising a hydrophilic additive.

4. The composition according to claim 1 wherein said elastomer comprises 1 to 5 parts by weight of the total composition.

5. The composition according to claim 1 wherein said elastomer is a styrene-ethylene-butylene-styrene block copolymer.

6. The composition according to claim 3 wherein said hydrophilic additive is a hydrophilic clay or a hydrophilic polymer.

7. A two part composition consisting essentially of:

PART I (a) 40 to 90 parts by weight of a plasticizer which does not stress-crack polycarbonate, said plasticizer being a naphthenic or paraffinic oil having an aromatic content of less than 15 weight percent, a paraffinic content of 85 to 100 percent, and a specific gravity in the range of 0.80 to 1.00, (b) 3 to 40 parts by weight of an aliphatic or aromatic carboxylic acid having 2 to 1000 carbon atoms;

PART II (c) 0.5 to 20 parts by weight of a basic oxide or hydroxide;

(d) an effective amount up to 20 parts by weight of an elastomer which is soluble in said composition and has a solubility parameter of 7 to 9; and said composition optionally further comprising in either or both parts an effective amount up to 30 parts by weight of at least one of thickening agents, flow point elevators, antioxidents, fungicides, and flame retardants.

8. The composition according to claim 7 wherein said elastomer comprises 5 to 10 parts by weight of the total composition.

9. The composition according to claim 7 wherein said elastomer is a styrene-ethylene-butylene-styrene block copolymer.

10. A composition of matter consisting essentially of a mixture of (a) 35 to 90 parts by weight of a plasticizer that does not stress-crack polycarbonate, said plasticizer being a naphthenic or paraffinic oil having an aromatic content of less than 15 weight percent, a paraffinic content of 85 to 100 percent, and a specific gravity in the range of 0.80 to 1.00, (b) 9 to 20 parts by weight of an aliphatic or aromatic carboxylic acid having 18 to 100 carbon atoms, (c) 2 to 20 parts by weight of a basic oxide or hydroxide, and (d) an effective amount up to 10 parts by weight of an elastomer which is soluble in said composition and which is selected from the group consisting of:
styrene-ethylene-butylene-styrene block copolymer,
styrene-butadiene-styrene block copolymer,
styrene-isoprene-styrene block copolymer,
ethylene-propylene terpolymer,
styrene-butadiene rubber,
ethylene-propylene copolymer,
styrene-butadiene block copolymer,
butyl rubber,
acrylonitrile-butadiene polymer,
polyisobutylene, and
ethylene-propylene rubber, and (e) optionally, an effective amount up to 30 parts by weight of at least one of thickening agents, flow point elevators, antioxidents, fungicides, and flame retardants.

11. The composition according to claim 10 wherein said specific gravity of said oil is in the range of 0.82 to 0.94.

12. The composition according to claim 10 wherein said oil is present in the range of 45 to 65 parts by weight of the total composition.

13. The composition according to claim 10 wherein said carboxylic acid is present in the range of 12 to 15 parts by weight of the total composition.

14. The composition according to claim 10 wherein said basic oxide is present in the range of 4 to 7.5 parts by weight of the total composition.

15. The composition according to claim 10 wherein said elastomer is present in the range of 1 to 5 parts by weight of the total composition.

16. The composition according to claim 10 wherein said carboxylic acid is stearic acid, dimer acid, or carboxyl-terminated butadiene.

17. The composition according to claim 10 wherein said elastomer is a styrene-ethylene-butylene-styrene block copolymer.

18. The composition according to claim 10 wherein said plasticizer is a mineral oil, a paraffinic/naphthenic oil, or a polybutene oligomer.

19. The composition according to claim 10 wherein said basic oxide is CaO or ZnO.

20. The composition according to claim 7 wherein said naphthenic or paraffinic oil is mineral oil, a polybutene oligomer, or a paraffinic/naphthenic oil.

21. The composition according to claim 7 wherein said carboxylic acid is valeric acid, octanoic acid, 2-ethylhexanoic acid, lauric acid, oleic acid, or isostearic acid.

22. A two part composition consisting essentially of:

PART I (a) 40 to 90 parts by weight of a plasticizer which does not stress-crack polycarbonate, said plasticizer being a naphthenic or paraffinic oil having an aromatic content of less than 15 weight percent, a paraffinic content of 85 to 100 percent, and a specific gravity in the range of 0.80 to 1.00, (b) 3 to 40 parts by weight of an aliphatic or aromatic carboxylic acid 2 to 1000 carbon atoms;

PART II (c) 0.5 to 20 parts by weight of a basic oxide or hydroxide, (d) an effective amount up to 20 parts by weight of an elastomer which is soluble in said composition and which is selected from the group consisting of:
styrene-ethylene-butylene-styrene block copolymer,
styrene-butadiene-styrene block copolymer,
styrene-isoprene-styrene block copolymer,
ethylene-propylene terpolymer,
styrene-butadiene rubber,
ethylene-propylene copolymer,
styrene-butadiene block copolymer,
butyl rubber,
acrylonitrile-butadiene polymer,
polyisobutylene,
ethylene-propylene rubber; and said composition optionally further comprising in either or both parts an effective amount up to 30 parts by weight of at least one of thickening agents, flow point elevators, antioxidents, fungicides, and flame retardants.

23. The composition according to claim 22 wherein said naphthenic or paraffinic oil is mineral oil, a polybutene oligomer, or a paraffinic/naphthenic oil.

24. The composition according to claim 22 wherein said carboxylic acid is valeric acid, octanoic acid, 2-ethylhexanoic acid, lauric acid, oleic acid, or isostearic acid.

* * * * *